United States Patent [19]

Kuroda

[11] Patent Number: 5,402,247
[45] Date of Patent: Mar. 28, 1995

[54] IMAGE REPRODUCTION SPEED CONVERSION APPARATUS

[75] Inventor: Kazuo Kuroda, Tokorozawa, Japan

[73] Assignee: Pioneer Electronic Corporation, Tokyo, Japan

[21] Appl. No.: 985,126

[22] Filed: Dec. 3, 1992

[30] Foreign Application Priority Data

Jan. 13, 1992 [JP] Japan .................. 4-004220

[51] Int. Cl.$^6$ .................. H04N 5/783; H04N 5/94
[52] U.S. Cl. .................. 358/335; 358/337; 358/312
[58] Field of Search .......... 358/335, 337, 338, 322, 358/312, 11, 183, 4, 311, 451; 360/36.1, 10.1, 10.3; 348/595, 597

[56] References Cited

U.S. PATENT DOCUMENTS

| | | | |
|---|---|---|---|
| 4,249,198 | 2/1981 | Ito et al. .................. | 358/326 |
| 4,283,736 | 8/1981 | Morio et al. .................. | 360/331 |
| 4,862,269 | 8/1989 | Sonoda et al. .................. | 358/183 |
| 5,070,412 | 12/1991 | Kumamoto et al. .................. | 358/451 |
| 5,122,885 | 6/1992 | Yoshioka et al. .................. | 358/335 |
| 5,146,352 | 9/1992 | Nannichi .................. | 358/451 |

*Primary Examiner*—Tommy P. Chin
*Assistant Examiner*—Huy Nguyen
*Attorney, Agent, or Firm*—Sughrue, Mion, Zinn, Macpeak & Seas

[57] ABSTRACT

An image reproduction speed conversion apparatus converts first image data to second image data. The image reproduction speed conversion apparatus includes: a memory device, to which the first image data is written in one by one on the basis of the write-in timing signal, and from which the second image data is read out one by one on the basis of the read-out timing signal; a surpassing-detection device for detecting a surpassing condition to output a surpassing-detection signal; and a surpassing-processing device for inserting picture data into or thinning out picture data from the second image data in response to the surpassing-detection signal.

7 Claims, 4 Drawing Sheets

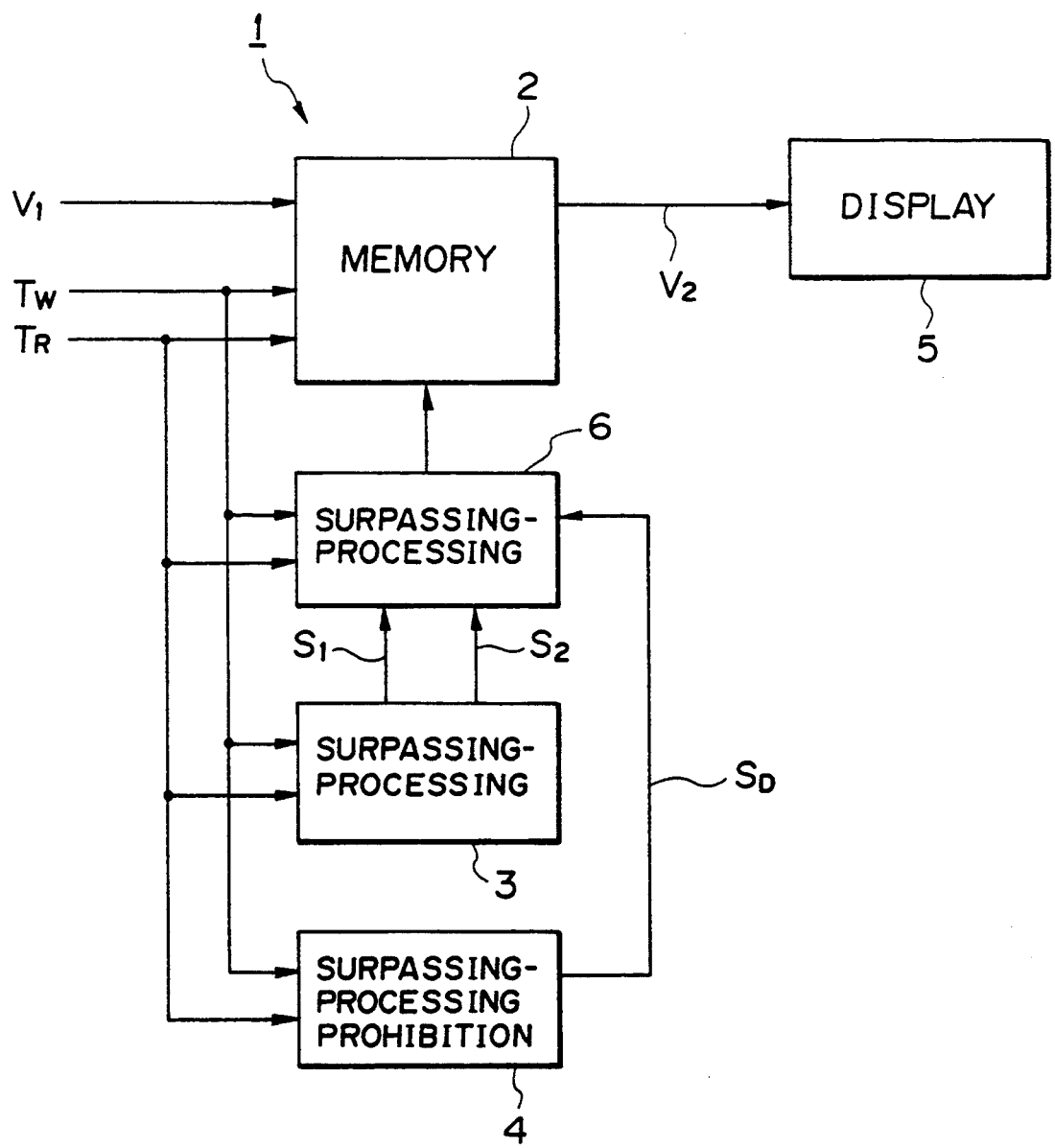

IMAGE REPRODUCTION SPEED CONVERSION APPARATUS

BACKGROUND OF THE INVENTION

1. Field of the Invention

This invention is related with an image reproduction speed conversion apparatus. More specifically, this invention is related with the image reproduction speed conversion apparatus, which can change the vertical scanning cycle and the horizontal scanning cycle of image signals, of LD (Laser Vision Disk), VTR (Video Tape Recorder) an so on, and which can perform a variable speed reproduction.

2. Description of the Related Art

A frame-synchronizer is one example of an image reproduction speed conversion apparatus which converts the horizontal scanning cycle of an image signal. A frame-synchronizer will be explained hereinbelow.

A frame-synchronizer is the apparatus which makes synchronizations of two video signals match to each other. The synchronous signal cycle of each video signal generally differs within the range of the standard.

Therefore, the synchronous signal cycle of one video signal is made to be a standard (standard synchronous signal cycle). The video signal of another side is A/D-converted (Analogue to Digital converted) by the synchronous signal cycle of the concerned video signal. The A/D-converted video signal is written in a frame memory, and is read out by the signal which is synchronized with the standard synchronous signal cycle. In this way, the video signals are synchronized to each other.

Generally, the synchronous signal cycles of two video signals differ with each other minimally. For this reason, the write-in timing and the read-out timing to a frame memory approach to each other by very small increments. Even so, a write-in timing may pass a read-out timing or a read-out timing may pass a write-in timing. Thus a surpassing state arises.

For example, data will be read before updating data of a frame memory when a write-in speed (write-in timing) is lower than a read-out speed (read-out timing) as shown in FIG. 1A. Thus, previous data will be erroneously read. Therefore, a picture corresponding to the present frame is displayed on the upper portion of the screen, while the picture corresponding to the previous frame is displayed on the bottom thereof. More concretely, the picture of the third frame is displayed in the first half of the time boundary by the arrow 51 in FIG. 1A. The picture of the second frame which should be displayed for the last time is displayed in the second half thereof.

Data corresponding to the picture of the next frame is written in the middle of data being read from the frame memory, when the write-in speed is higher than the read-out speed, as shown in FIG. 1B. Thus, when this data is read out and displayed on a display device etc., a gap in the picture arises, and thus a gap of the color phase arises. More concretely, the picture of the third frame is displayed in the first half of the boundary of time shown by the arrow 52 in FIG. 1B, while the picture of the fourth frame which should be displayed for the next time is displayed in the second half thereof.

Surpassing-processing to be performed when such a surpassing state arises is as follows.

a) A write-in processing is not performed to the frame with respect to which it is predicted that a surpassing state arises. or b) An operation of writing data corresponding to the scanning line with respect to which it is predicted that a surpassing state arises, is not performed.

Gaps of the color phase arise in the surpassing-processing of above-mentioned a) and b). In order to maintain the continuity of the color phase, an exclusive color phase processing is necessarily performed.

Moreover, in the applied apparatus using a field memory instead of a frame memory, passing of the field arises from the moment of passing. Thus, the field inversion phenomenon arises. Namely, the phenomena that the picture of the second field is displayed on the first field, and the picture of the first field is displayed on the second field, arise. For this reason, for example, the surpassing-processing is performed by shifting the first field display position by one scanning line, to prevent the inversion of the field.

By the way, with respect to the television signal of NTSC (National Television System Committee) system, for example in usual TV (Television) display device, 262.5 scanning lines per field are required. The number of effective scanning lines which appears on an actual screen is 245. The remainder is spent in a vertical-retrace term and are therefore invalid. For this reason, one field consists of 245 scanning lines in the actual picture plane (real display screen).

However, the surpassing-processing is performed whenever a surpassing state arises in the above-mentioned image reproduction speed conversion apparatus. That is to say, a surpassing-processing will be always performed even when a surpassing state arises in an invalid screen portion e.g., in other than the effective screen portion (which is actually displayed). Thus, there is a problem that picture degradation of the effective screen is all the more likely when performing a surpassing-processing.

SUMMARY OF THE INVENTION

It is therefore an object of the present invention to provide an image reproduction speed conversion apparatus, which does not perform an unnecessary surpassing-processing even when it is the case where a surpassing state occurs, and thus which can output the image signal to display the picture plane with good quality.

According to the present invention, the above mentioned object can be achieved by an image reproduction speed conversion apparatus, for converting first image data to second image data having a scanning cycle different from that of the first image data, to which a write-in timing signal and a read-out timing signal are input externally. The image reproduction speed conversion apparatus includes: a memory device for storing image data, to which the first image data is written in one by one on the basis of the write-in timing signal, and from which the second image data is read out one by one on the basis of the read-out timing signal; a surpassing-detection device for detecting that the read-out timing of the next time comes before the end of writing of the first image data of the present time, to output a first surpassing-detection signal, and for detecting that the write-in timing of the next time comes before the end of reading of the second image data of the present time, to output a second surpassing-detection signal; and a surpassing-processing device for inserting picture data into the second image data on the basis of the data stored in the memory device in response to the first surpassing-detection signal output during the term corresponding to an effective scanning line of the second image data, and for thinning out picture data from the second image data in response to the second surpassing-detection signal output during the term corresponding to the effective scanning line of the second image data.

According to the present invention thus constructed, when the first surpassing-detection signal is output by the surpassing-detection device, the surpassing-processing device inserts the picture data, e.g., the picture data for at least one picture plane, into the second image data on the basis of the data stored in the memory device, during the term corresponding to the effective scanning line of the second image data. On the other hand, when the second surpassing-detection signal is output by the surpassing-detection device, the surpassing-processing device thins out the picture data, e.g., the picture data for at least one picture plane, from the second image data during the term corresponding to the effective scanning line of the second image. That is to say, even when the first or second surpassing-detection signal is output during the term other than the term corresponding to the effective scanning line of the second image data, in the term corresponding to the horizontal-scanning cycle and the vertical-scanning cycle of second image data based on the write-in timing signal and the read-out timing signal, the surpassing-processing device does not insert or thin out the picture data.

Therefore, even if a surpassing state arises during the term other than the term corresponding to the effective scanning line, the surpassing-processing is not performed. Consequently, the degradation of display quality of a display screen due to unnecessary surpassing processing can be prevented according to the present invention.

The nature, utility, and further features of this invention will be more clearly apparent from the following detailed description with respect to preferred embodiments of the invention when read in conjunction with the accompanying drawings briefly described below.

BRIEF DESCRIPTION OF THE DRAWINGS

FIG. 2 is a block diagram which shows the construction of a first embodiment;

DETAILED DESCRIPTION OF THE PREFERRED EMBODIMENTS

Figure 1A:
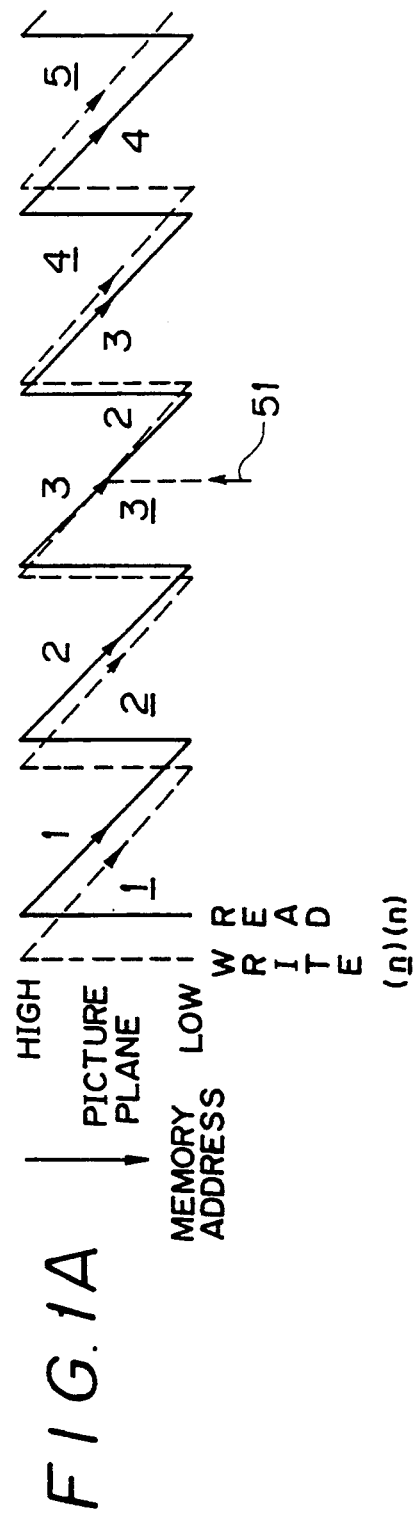
FIG. 1A and FIG. 1B are views for explaining a surpassing state.
Figure 1B:
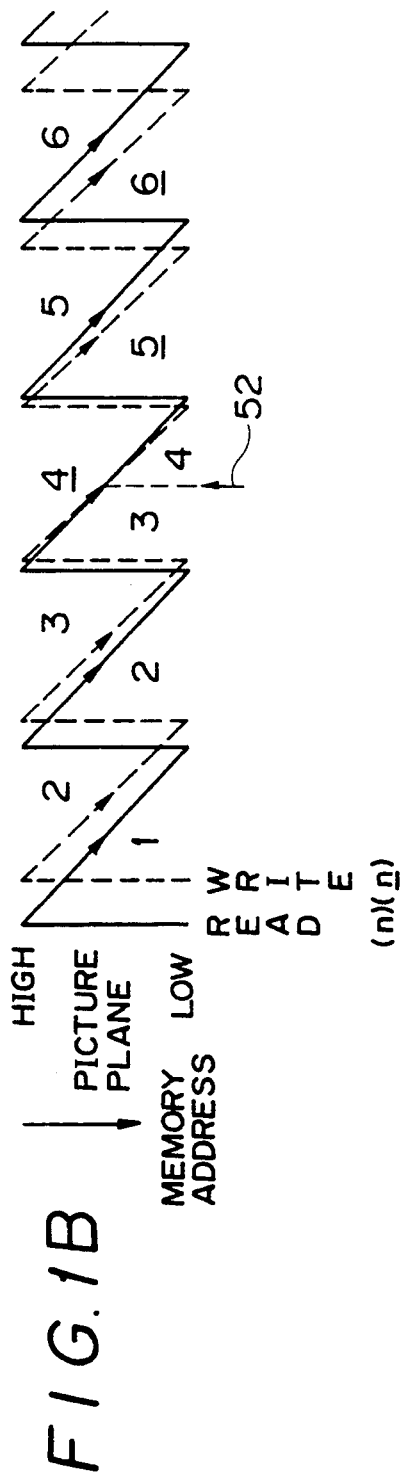

Referring to the accompanying drawings, an embodiment of the present invention will be now explained.

FIG. 2 is a block diagram which indicates the basic construction of the first embodiment of the present invention.

An image reproduction speed conversion apparatus 1 has a memory 2, a surpassing-detection unit 3, a surpassing-processing prohibition unit 4, a display unit 5, and a surpassing-processing unit 6.

The memory 2 has a first domain in which write-in/read-out is possible, and a second domain, in which write-in/read-out is possible. On the basis of a write-in timing signal Tw corresponding to the first horizontal-scanning cycle input from an external source, first image data V1 is written one by one in the first domain of the memory 2. On the basis of a read-out timing signal Tr corresponding to the second horizontal-scanning cycle input from an external source, second-image data V2 is read from the memory 2.

On the basis of the write-in timing signal Tw and read-out timing signal Tr, the surpassing-detection unit 3 detects in advance that the read-out timing of second-image data V2 of the next time period comes before the end of the writing operation of the first image-data V1 to memory 2 of the present time period, so that the surpassing-detection unit 3 outputs a first surpassing-detection signal S1.

On the other hand, on the basis of the write-in timing signal Tw and the read-out timing signal Tr, the surpassing-detection unit 3 detects in advance that the write-in timing of the first image data V1 of the next time period comes before the end of read-out of the second image data V2 from the memory 2 of the present time period, so that the surpassing-detection unit 3 outputs a second surpassing-detection signal S2.

In parallel to this process, during the term, except the term corresponding to the effective scanning line of the display unit 5 in the term which corresponds to the second horizontal-scanning cycle, when the first surpassing-detection signal S1 or the second surpassing-detection signal S2 is outputted from the surpassing-detection unit 3, the surpassing-processing prohibition unit 4 outputs a surpassing-processing prohibition signal Sd, which prohibits the operation of the surpassing-processing unit 6, on the basis of the write-in timing signal Tw and the read-out timing signal Tr.

Thereby, when the first surpassing-detection signal S1 is outputted from the surpassing detection unit 3, and the surpassing-processing prohibition signal Sd is not output from the surpassing-processing prohibition unit 4, the surpassing-processing unit 6 transfers the first image data V1, which has been written into the first domain of the memory 2 during the last time period, to the second domain of the memory 2. In parallel to the writing operation of the first image data V1 for the next time into the first domain of the memory 2, the surpassing-processing unit 6 reads the second image data V2 from the second domain again, so as to insert the same picture plane. Moreover, when the second surpassing-detection signal S2 is output from the surpassing detection unit 3, and the surpassing-processing prohibition signal Sd is not output from the surpassing-processing prohibition unit 4, the surpassing-processing unit 6 thins out the picture plane by prohibiting the writing operation of second image data V2 to the memory 2. Furthermore, when the surpassing-processing prohibition signal Sd is output from the surpassing-processing prohibition unit 4, the surpassing-processing unit 6 is idle.

Therefore, when the surpassing state arises during the term which does not affect the effective display picture plane of display unit 5, the surpassing-processing prohibition unit 4 prohibits the operation of the surpassing-processing unit 6. As the result, the surpassing-processing is not performed. Thus, the degradation in display quality of the display plane of display unit 5 due to unnecessary surpassing-processing, can be efficiently prevented.

In the above mentioned first embodiment, the writing operation (transferring) of the data to the second domain of the memory 2 is performed after generating the first surpassing-detection signal S1. However, it may be arranged that data is written concurrently in the first domain and the second domain, and that the data of the second domain is not updated when the first surpassing-detection signal S1 is output.

Figure 3:
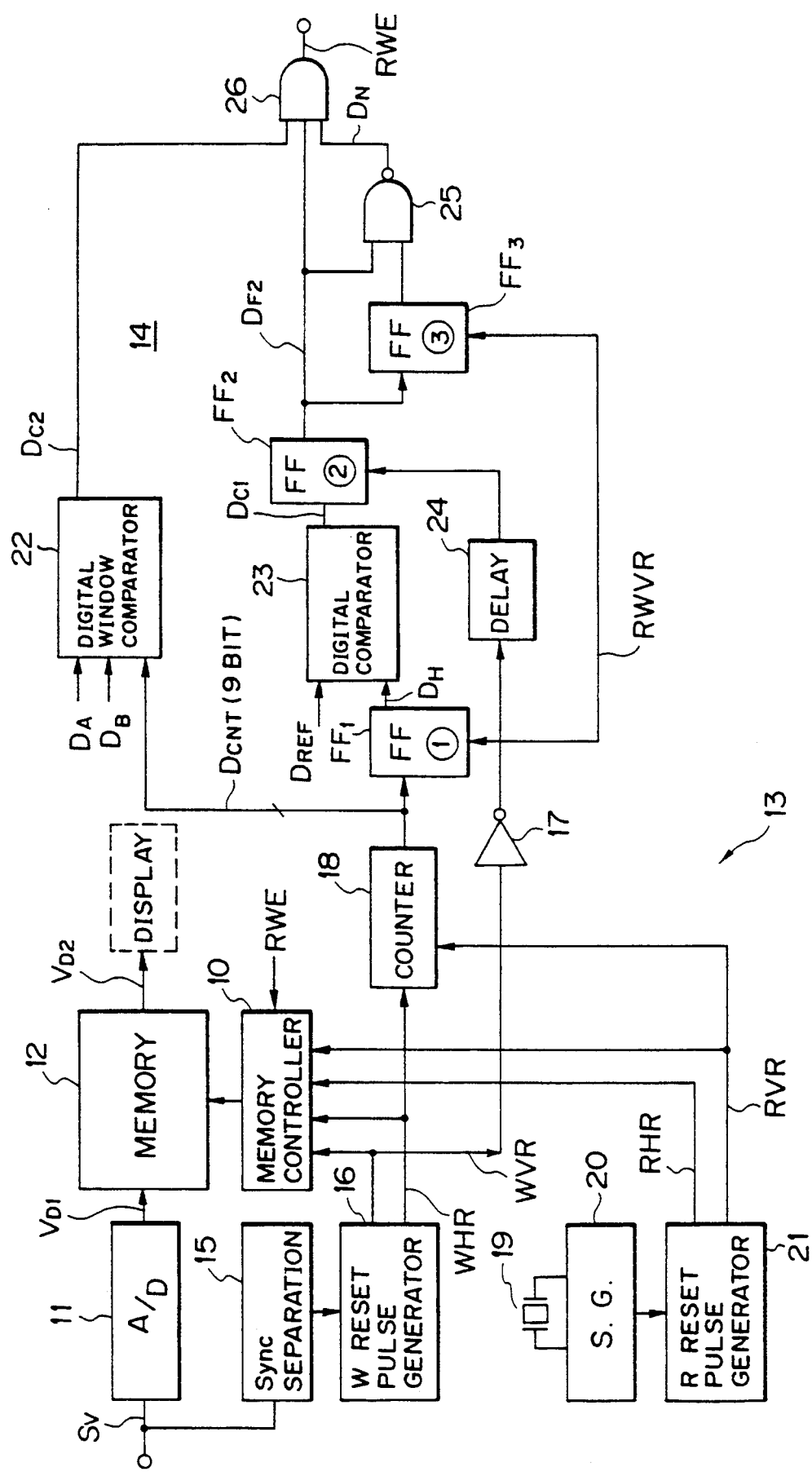
FIG. 3 is a block diagram which shows the construction of a second embodiment.

Next, with reference to FIGS. 3 to 5, the second embodiment of the present invention will be explained in detail. The explanation is made for the case where the write-in speed of data to the memory is higher than the read-out speed for simplification of explanation.

The image reproduction speed conversion apparatus has a memory controller 10, an A/D converter 11, a memory 12, a surpassing-detection circuit 13, and a surpassing-processing prohibition circuit 14.

The memory controller 10 performs the surpassing-processing control. The memory 12 stores a first video data Vd1 made by converting an input video signal SV by the A/D converter 11. Then, the memory 12 outputs a second video data Vd2 under the control of memory controller 10. The surpassing-detection circuit 13 detects whether the surpassing state occurred or not. The surpassing-processing prohibition circuit 14 determines whether the surpassing-processing is to be performed or not.

The surpassing-detection circuit 13 has a synchronous signal separation circuit 15 which separates the (horizontal and vertical) synchronous signal Sync from the input video signal Sv (for example, horizontal-scanning frequency of 16 MHz). Based on the synchronous signal output from the synchronous signal separation circuit 15, a write-in reset pulse generator 16 outputs a vertical write-in reset pulse WVR (refer to line (a) in FIG. 4) to the memory controller 10 and an invertor 17. The write-in reset pulse generator 16 outputs a horizontal write-in reset pulse WHR to the memory controller 10 and a clock terminal of a counter 18.

The surpassing-detection circuit 13 has a crystal oscillator 19 which outputs the standard signal. On the basis of the standard signal, a synchro-generator (S.G) 20 generates the synchronous signal (for example, horizontal-scanning frequency of 14.3 MHz). The synchro-generator 20 outputs this synchronous signal to a read-out reset pulse generator 21. The read-out reset pulse generator 21 receives this output synchronous signal, and outputs a vertical read-out reset pulse RVR (refer to line (b) in FIG. 4) to the memory controller 10 and the counter 18. The read-out reset pulse generator 21 outputs a horizontal read-out reset pulse RHR to the memory controller 10 and the reset terminal of the counter 18.

Figure 4:
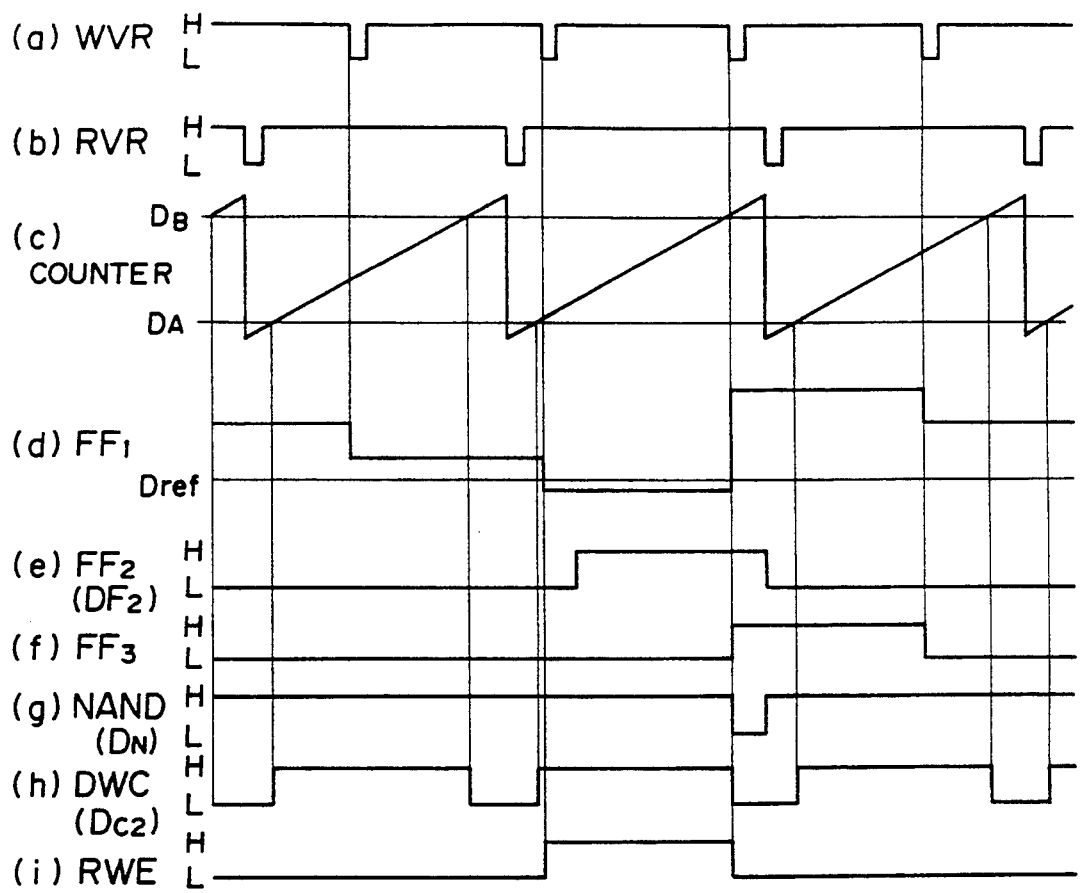
FIG. 4 is a timing chart which indicates operation of a second embodiment.

The counter 18 counts the number of the input horizontal write-in reset pulses WHR from the time when the vertical read-out reset pulse RVR is generated, and outputs 9-bit count output data Dcnt (refer to line (c) in FIG. 4) to the input terminals of a first flipflop circuit FF1 and a digital window comparator 22. The counter 18 is count-reset by the vertical read-out reset pulse RVR.

By use of the vertical write-in reset pulse Wvr as a latch signal, the first flipflop circuit FF1 latches the count output data Dcnt. Thereby, the number of the horizontal write-in reset pulses WHR, until the time when the vertical write-in reset pulse WVR is generated from the time when the vertical read-out reset pulse RVR is generated, is latched to the first flipflop circuit FF1. The first flipflop circuit FF1 outputs data Dh (refer to line (d) in FIG. 4 ), which indicates the counted number of the horizontal write-in reset pulses WHR, to one terminal of a digital comparator 23. A comparison fiducial-value data Dref corresponding to the comparison fiducial value, is inputted from the external source to another terminal of the digital comparator 23. When the data Dh is smaller than the comparison fiducial-value data Dref, the digital comparator 23 makes its comparison output data Dc1 "H" (high) level.

Figure 5:
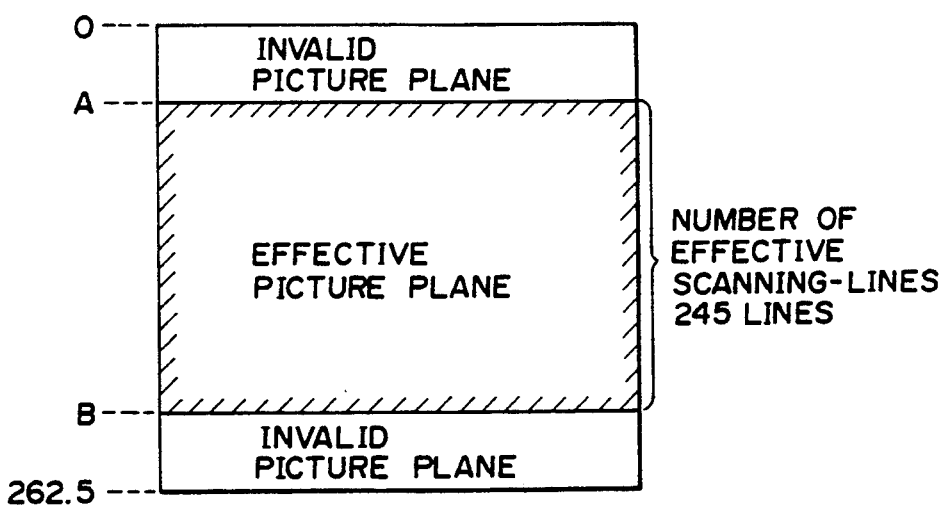
FIG. 5 is a view for explaining an effective picture plane.

As for the digital window comparator 22, comparison data Da and Db, which correspond respectively to scanning line No. A and B in the effective picture plane of FIG. 5, are input into its comparison input terminals, respectively. When the count output data Dcnt is greater than the compared data Da and less than compared data Db, the digital window comparator 22 makes its comparison output data Dc2 "H" level (refer to line (h) in FIG. 4). Accordingly, only when the present scanning line number corresponds to the line number of the effective picture plane, the comparison output data Dc2 becomes "H" level so that a surpassing-processing is permitted.

When the vertical write-in reset pulse WVR is inputted into the invertor 17, the invertor 17 outputs a reversal vertical write-in reset pulse RWVR to the reset terminal of first flipflop circuit FF1, a delay circuit 24, and the set terminal of a third flipflop circuit FF3. The delay circuit 24 delays the reversal vertical write-in reset pulse RWVR only by the time length corresponding to the operation processing time of the digital comparator 23, and outputs thus delayed pulse to the reset terminal of a second flipflop circuit FF2.

Thus, when it has elapsed the operation processing time of the digital comparator 23 from the output time of the vertical write-in reset pulse WVR, the output of digital comparator 23 is latched to the second flipflop circuit FF2. Output data Df2 (refer to line (e) in FIG. 4) of the second flipflop circuit FF2 is outputted to the input terminal of the third flipflop circuit FF3, one input terminal of a NAND circuit 25, and one input terminal of an AND circuit 26. Here, the third flipflop circuit FF3 and the NAND circuit 25 constitute the incorrect operation preventing circuit, which prevents performance the unnecessary surpassing-processing due to the output signal of the second flipflop circuit FF2 accidentally.

The output signal of the second flipflop circuit FF2, output data Dn (refer to line (g) in FIG. 4) of the NAND circuit 25, and the output data Dc2 of the digital window comparator 22, are inputted into the AND circuit 26. When all of these input signals become "H" level, the AND circuit 26 makes its reversal write-in enable signal RWE "H" level (refer to line (i) FIG. 4), and outputs the signal RWE to the memory controller 10.

If the reversal write-in enable signal RWE is input, the memory controller 10 will prohibit the writing of the first video data Vd1 to the memory 12. Therefore, the second video data Vd2 is thinned out for 1 frame, and is to be read out.

On the other hand, when the output data Dc2 of the digital window comparator 22 inputted into the AND circuit 26 is "L" level, i.e., when it is outside of the range of the effective picture-plane, the reversal write-in enable signal Rwe always becomes "L" level. Accordingly, an unnecessary surpassing-processing is not performed even when a surpassing state occurs. Therefore, the display in the effective picture plane becomes the ordinary display, while the degradation picture plane quality can be efficiently avoided.

Only the case where the write-in speed is higher than the read-out speed is explained in the above-mentioned second embodiment. However, the present embodiment can be adapted to the case where the read-out speed is higher than the write-in speed, just by reading out the second video data Vd2 again on the basis of the data in the memory 12 so as to insert the same picture plane, as in the case of the first embodiment, so that the display is performed without the inconvenience to the visible picture plane of the display device on the whole.

Moreover, only processing in a frame unit has been explained in the above-mentioned embodiment. However, processing in a field unit is also possible by virtue of the present invention. In this case, the surpassing-processing is performed as follows. Namely, when the same field is displayed continuously, it displays the vertical synchronous signal of the concerned field with shifting it by an amount corresponding to its ½ scanning line, so that, by scanning in the middle position between the ordinary first and second fields, it can improve picture-plane quality more.

As described above in detail, even though the surpassing state arises during the term except the term corresponding to the effective scanning line, the surpassing-processing prohibition unit prohibits the operation of the surpassing-processing unit.

Accordingly, since the number of times of performing the surpassing-processing, such as insertion of the frame, and the thinning-out of the frame, can be decreased, when the variable speed reproduction of CD, LD etc. is performed, the picture degradation accompanied by the unnecessary surpassing-processing, can be diminished, according to the present embodiments.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. An image reproduction speed conversion apparatus, for converting first image data to second image data having a scanning cycle different from that of the first image data, to which a write-in timing signal and a read-out timing signal are input from an external source, said apparatus comprising:

memory means for storing image data, to which the first image data is written in sequentially on the basis of the write-in timing signal, and from which the second image data is read out sequentially on the basis of the read-out timing signal;

surpassing-detection means for detecting that the read-out timing of said second image data during a relative next time period comes before the end of writing of the first image data during a relative present time period, to output a first surpassing-detection signal, and for detecting that the write-in timing of said first image data of the next time period comes before the end of reading of the second image data of the present time period, to output a second surpassing-detection signal; and surpassing-processing means for inserting said image data into the second image data on the basis of the image data stored in said memory means in response to the first surpassing-detection signal output during the term corresponding to an effective scanning line of the second image data, and for thinning out said image data from the second image data in response to the second surpassing-detection signal output during the term corresponding to the effective scanning line of the second image data, said surpassing-processing means further comprising:

processing means for selectively inserting and thinning-out said image data; and prohibition means permitting a predetermined signal to prohibit inserting and thinning operations of said processing means during the term other than the term corresponding to the effective scanning line of the second image data.

2. An apparatus according to claim 1, wherein said surpassing detection means is responsive to the write-in timing signal and the read-out timing signal.

3. An apparatus according to claim 1, wherein said surpassing detection means comprises a synchronous signal extracting means for extracting a synchronous signal component from the first image data.

4. An apparatus according to claim 1, wherein said surpassing-processing means selectively permits inserting and thinning-out of said image data corresponding to at least one picture plane.

5. An apparatus according to claim 1, wherein the write-in timing signal is input with a predetermined timing based on a selected one of a horizontal-scanning cycle and a vertical-scanning cycle of the first image data.

6. An apparatus according to claim 1, wherein the read-out timing signal is input with a predetermined timing based on the horizontal scanning cycle of the second image data.

7. An apparatus according to claim 1, wherein said surpassing-processing means selectively permits inserting and thinning-out of the image data when the surpassing-detection signal is output during the term corresponding to the effective scanning line of the second image data, in the term corresponding to a horizontal-scanning cycle and a vertical-scanning cycle of the second image data.

* * * * *